US010714111B2

(12) United States Patent
Heitkamp et al.

(10) Patent No.: US 10,714,111 B2
(45) **Date of Patent: *Jul. 14, 2020**

(54) ENHANCED ADAPTIVE AUDIO RENDERING TECHNIQUES

(71) Applicant: Microsoft Technology Licensing, LLC, Redmond, WA (US)

(72) Inventors: Robert Norman Heitkamp, Sammamish, WA (US); Steven Wilssens, Kenmore, WA (US); Philip Andrew Edry, Seattle, WA (US); Paul J. Radek, Bellevue, WA (US); Ibrahim Ziyad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,183

(22) Filed: Jan. 16, 2019

(65) Prior Publication Data

US 2019/0221224 A1 Jul. 18, 2019

Related U.S. Application Data

(63) Continuation of application No. 15/460,163, filed on Mar. 15, 2017, now Pat. No. 10,229,695.

(Continued)

(51) Int. Cl.

*G10L 19/20* (2013.01)
*G06F 3/16* (2006.01)

(Continued)

(52) U.S. Cl.

CPC ................ *G10L 19/20* (2013.01); *G06F 3/16* (2013.01); *G06F 3/162* (2013.01); *G06F 3/165* (2013.01);

(Continued)

(58) Field of Classification Search

None

See application file for complete search history.

(56) References Cited

FOREIGN PATENT DOCUMENTS

CN 102089809 A 6/2011
CN 103988150 A 8/2014

(Continued)

OTHER PUBLICATIONS

"Office Action Issued in European Patent Application No. 17719390.1", dated Oct. 23, 2019, 4 Pages.

(Continued)

*Primary Examiner* — Qin Zhu
(74) *Attorney, Agent, or Firm* — Newport IP, LLC; Scott Y. Shigeta

(57) ABSTRACT

The techniques disclosed herein provide application programming interfaces (APIs) for enabling a system to select a spatialization technology. The APIs also enable a system to balance resources by allocating audio objects to a number of applications executing on a computer system. The system coordinates the audio objects between applications and each application can control the number of objects they individually generate. In some configurations, the system can also fold audio objects across different applications. Different spatialization technologies can be selected based on an analysis of contextual data and policy data. For instance, when a new headphone system is plugged in, the system may switch from Dolby Atmos to the Microsoft HoloLens HRTF spatialization technology. The system can dynamically control a number of generated audio objects and dynamically change a utilized spatialization technology based on changes to a computing environment.

20 Claims, 8 Drawing Sheets

Related U.S. Application Data

(60) Provisional application No. 62/315,530, filed on Mar. 30, 2016.

(51) Int. Cl.

| | |
|---|---|
| ***G10L 19/008*** | (2013.01) |
| ***H04S 7/00*** | (2006.01) |
| ***H04S 3/00*** | (2006.01) |
| ***H04L 29/06*** | (2006.01) |

(52) U.S. Cl.

CPC ........ *G10L 19/008* (2013.01); *H04L 65/1006* (2013.01); *H04S 3/002* (2013.01); *H04S 3/008* (2013.01); *H04S 7/308* (2013.01); *H04S 7/303* (2013.01); *H04S 2400/11* (2013.01)

(56) References Cited

FOREIGN PATENT DOCUMENTS

| | | |
|---|---|---|
| CN | 104050969 A | 9/2014 |
| CN | 104520924 A | 4/2015 |

OTHER PUBLICATIONS

"Office Action Issued in European Patent Application No. 17720288.4", dated Oct. 23, 2019, 4 Pages.

"First Office Action and Search Report Issued in Chinese Patent Application No. 201780022312.4", dated Apr. 17, 2020, 11 Pages.

"First Office Action and Search Report Issued in Chinese Patent Application No. 201780022292.0" , dated Apr. 17, 2020, 11 Pages.

ENHANCED ADAPTIVE AUDIO RENDERING TECHNIQUES

CROSS REFERENCE TO RELATED APPLICATION

This patent application is a continuation of and claims priority to U.S. application Ser. No. 15/460,163, entitled "APPLICATION PROGRAMING INTERFACE FOR ADAPTIVE AUDIO RENDERING," filed Mar. 15, 2017 and claims the benefit of U.S. Provisional Patent Application Ser. No. 62/315,530 filed Mar. 30, 2016, entitled "ENHANCED MANAGEMENT OF SPATIALIZATION TECHNOLOGIES," which are hereby incorporated in its entirety by reference.

BACKGROUND

Some software applications can process object-based audio to utilize one or more spatialization technologies. For instance, a video game can utilize a spatialization technology, such as Dolby Atmos, to generate a rich sound that enhances a user's experience. Although some applications can utilize one or more spatialization technologies, existing systems have a number of drawbacks. For instance, some systems cannot coordinate the use of spatialization technologies when multiple applications are simultaneously processing channel-based audio and object-based audio.

In one example scenario, if user is running a media player that is utilizing a first spatialization technology and running a video game utilizing another spatialization technology, both applications can take completely different paths on how they render their respective spatially encoded streams. To further this example, if the media player renders audio using HRTF-A and the video game renders audio using HRTF-B, and both output streams are directed to a headset, the user experience may be less than desirable since the applications cannot coordinate the processing of the signal to the headset.

Since some applications do not coordinate with one another when processing spatialized audio, some existing systems may not efficiently utilize computing resources. In addition, when multiple applications are running, one application utilizing a particular output device, such as a Dolby Atmos speaker system, can inhibit another application's ability to fully utilize the same spatialization technology. Thus, a user may not be able to hear all sounds from each application.

Some existing systems also make it difficult for application developers. Today, developers are limited since they have to be aware of the availability and/or ownership rights of a spatialization technology. This obstacle for developers limits deigns options for applications.

It is with respect to these and other considerations that the disclosure made herein is presented.

SUMMARY

The techniques disclosed herein provide a generic interface that enables developers to design applications without having to be concerned about the specifics, availability, or ownership rights of a spatialization technology used for rendering object-based audio signals. In some configurations, one or more application programing interfaces (APIs) enable a system to coordinate the processing of object-based audio and channel-based audio generated by multiple applications. The APIs can receive input signals including a plurality of channel-based audio signals, object-based audio signals, and contextual data. For illustrative purposes, the contextual data is also referred to herein as capability data. The system determines a spatialization technology to utilize based on contextual data. In some configurations, the contextual data can indicate the capabilities of one or more computing resources. For example, the contextual data can indicate that an endpoint device has Dolby Atmos or DTSX capabilities. In some configurations, the contextual data can also indicate preferences. The preferences, for example, can indicate user preferences for a type of spatialization technology, e.g., Dolby Atmos, over another type of spatialization technology, e.g., DTSX. Based on the contextual data, the system can select a spatialization technology and a corresponding encoder to process the input signals to generate a spatially encoded stream that appropriately renders the audio of multiple applications to an available output device. The techniques disclosed herein also allow a system to dynamically change the spatialization technologies during use. The techniques of which are collectively referred to herein as adaptive audio rendering.

The APIs can also communicate control data to the applications. For instance, control data communicated from the system to, via the API, an application can include instructions on how to process or shape an audio signal provided by the application. In one illustrative example, control data communicated via the API can instruct an application to perform one or more functions, which may include a folding algorithm. The control data can also control a number of generated objects by an application, or even cause two or more applications to fold, e.g., combine, audio objects. The generated audio objects can then be rendered by an encoder and communicated to one or more output devices.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1A:
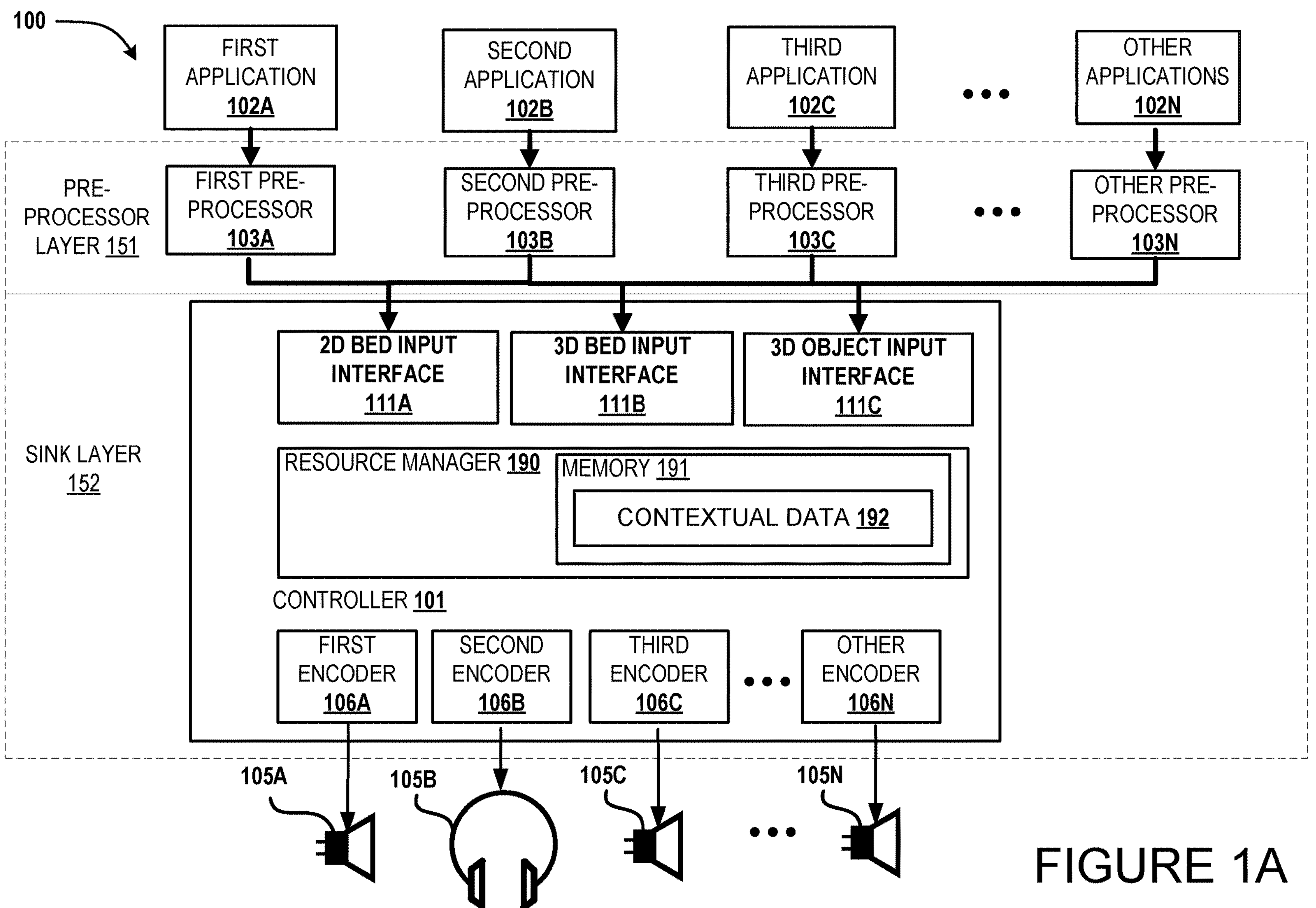
FIG. 1A illustrates an example multiprocessor computing device for enabling adaptive audio rendering.

The techniques disclosed herein provide a generic interface that enables developers to design applications without having to be concerned about the specifics, availability, or ownership rights of a spatialization technology used for rendering object-based audio signals. In some configurations, one or more application programing interfaces (APIs) enable a system to coordinate the processing of object-based audio and channel-based audio generated by multiple applications. The APIs can receive input signals including a plurality of channel-based audio signals, object-based audio signals and contextual data. For illustrative purposes, the contextual data is also referred to herein as capability data. The system determines a spatialization technology to utilize based on contextual data. In some configurations, the contextual data can indicate the capabilities of one or more computing resources. For example, the contextual data can indicate that an endpoint device has Dolby Atmos or DTSX capabilities. In some configurations, the contextual data can also indicate preferences. The preferences, for example, can indicate user preferences for a type of spatialization technology, e.g., Dolby Atmos, over another type of spatialization technology, e.g., DTSX. Based on the contextual data, the system can select a spatialization technology and a corresponding encoder to process the input signals to generate a spatially encoded stream that appropriately renders the audio of multiple applications to an available output device. The techniques disclosed herein also allow a system to dynamically change the spatialization technologies during use. The techniques of which are collectively referred to herein as adaptive audio rendering.

The APIs can also communicate data back to the applications. For instance, data communicated from the system to, via the API, an application can include instructions on how to process or shape an audio signal provided by the application. In one illustrative example, control data communicated via the API can instruct an application to perform one or more functions, which may include a folding algorithm. The control data can also control a number of generated objects by an application, or even cause two or more applications to fold or combine audio objects. The generated audio objects can then be rendered by an encoder and communicated to one or more output devices.

In one illustrative example, a system can receive input signals including a plurality of channel-based audio signals as well as object-based audio. The system determines a spatialization technology to utilize based on contextual data. In some configurations, the contextual data can indicate the capabilities of one or more computing resources. For example, the contextual data can indicate that an endpoint device has Dolby Atmos or DTSX capabilities. In some configurations, the contextual data can also indicate preferences. The preferences, for example, can indicate user preferences for a type of spatialization technology, e.g., Dolby Atmos, over another type of spatialization technology, e.g., DTSX. Based on the contextual data, the system can select a spatialization technology and a corresponding encoder to process the input signals to generate a spatially encoded stream that appropriately renders the audio of multiple applications to an available output device. The techniques disclosed herein also allow a system to dynamically change the spatialization technologies during use, the techniques of which are collectively referred to herein as adaptive audio rendering.

The techniques disclosed herein can also coordinate computing resources to balance processing loads of various components of a system. In some configurations, a system can determine the capabilities of one or more resources, such as an encoder, an endpoint device, or an application. An encoder, for example, may have a limitation with respect to the number of objects it can process. Contextual data indicating such capabilities can be communicated to preprocessors and/or applications to coordinate and control the processing of object-based audio generated by the preprocessors and the applications. The preprocessors and applications may perform one or more operations, which may include folding algorithm, to control a number of generated objects of an object-based audio signal. Coordination and control at the application and preprocessor level enables a system to distribute processing tasks.

To illustrate aspects of the techniques disclosed herein, consider an example scenario where a system is connected to an HIMDI receiver that supports Dolby Atmos as a spatialization technology. In this example, it is also a given that contextual data defining a user preference indicates that a head-related transfer function (HRTF) spatialization technology is preferred when headphones are available, and that the Dolby Atmos technology is preferred when the headphones are not available. One or more components can provide contextual data indicating one or more endpoint capabilities. For example, contextual data can be generated by a device to indicate when headphones or speakers are connected and/or indicate a type of spatialization technology that is utilized. The contextual data can also indicate when an encoder and an endpoint device, e.g., an output device such as a headphone set or speaker set, is compatible with a particular spatialization technology.

Based on the analysis of the contextual data, the system can select a spatialization technology. In the present example, when headphones are not plugged in, the system selects a Dolby Atmos encoder to process the input signals received from one or more applications. The encoder can generate a spatially encoded stream that will appropriately render to a connected output device, e.g., speakers.

When the headphones are plugged in, the system can select and utilize a suitable spatialization technology, such as the Microsoft HoloLens HRTF spatialization technology, to process the input signals received from one or more applications. An encoder utilizing the selected spatialization technology can generate an output stream that appropriately renders to the headphones. These examples are provided for illustrative purposes and are not to be construed as limiting.

The system is configured to dynamically switch between the spatialization technologies during use of the system. The selected spatialization technology can dynamically change in response to one or more events, which may include a change in a system configuration, a user input, a change with respect to a user interface (UI) of an application, etc. The system can analyze any suitable update to the contextual data or any system data to determine which spatialization technology to utilize.

The system can be configured to download any suitable spatialization technology. Preference data can also be updated at any time. The preference data may associate any new spatialization technology with certain types of output devices, e.g., certain types of headphones and/or speaker arrangements. A user can also prioritize each spatialization technology based on one or more conditions to accommodate a number of use scenarios. For example, preference data may indicate that the new spatialization technology may be utilized when a particular set of headphones are available or when a particular TV is available. More complex scenarios can be defined in the preference data as well. For example, if a user is in a particular room with a specific set of speakers, the system will detect the availability of such components and utilize the appropriate spatialization technology based on the endpoint capabilities and the preference data.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling adaptive audio rendering. As will be described in more detail below with respect to FIG. 5, there are a number of applications and modules that can embody the functionality and techniques described herein.

FIG. 1A is an illustrative example of a system 100 configured to dynamically select a spatialization technology based on analysis of contextual data. The system 100 comprises a controller 101 for storing, communicating, and processing contextual data 192 stored in memory 191. The controller 101 also comprises a 2D bed input interface 111A, a 3D bed input interface 111B, and a 3D object input interface 111C respectively configured to receive input signals, e.g., 2D bed audio, 3D bed audio, and 3D object audio, from one or more applications. The controller 101 also comprises a suitable number (N) of encoders 106. For illustrative purposes, some example encoders 106 are individually referred to herein as a first encoder 106A, a second encoder 106B, and a third encoder 106C. The encoders 106 can be associated with a suitable number (N) of output devices 105. For illustrative purposes, some example output devices 105 are individually referred to herein as a first output device 105A, a second output device 105B, a third output device 105C.

The system 100 can also include a suitable number (N) of preprocessors 103. For illustrative purposes, some example preprocessors 103 are individually referred to herein as a first preprocessor 103A, a second preprocessor 103B, and a third preprocessor 103C. The system 100 can also include any suitable number (N) of applications 102. For illustrative purposes, some example applications 102 are individually referred to herein as a first application 102A, a second application 102B, and a third application 102C. The system 100 can also include a preprocessor layer 151 and a sink layer 152. The example system 100 is provided for illustrative purposes and is not to be construed as limiting. It can be appreciated that the system 100 can include fewer or more components than those shown in FIGS. 1A and 1B.

2D bed audio includes channel-based audio, e.g., stereo, Dolby 5.1, etc. 2D bed audio can be generated by software applications and other resources.

3D bed audio includes channel-based audio, where individual channels are associated with objects. For instance, a Dolby 5.1 signal includes multiple channels of audio and each channel can be associated with one or more positions. Metadata can define one or more positions associated with individual channels of a channel-based audio signal. 3D bed audio can be generated by software applications and other resources.

3D object audio can include any form of object-based audio. In general, object-based audio defines objects that are associated with an audio track. For instance, in a movie, a gunshot can be one object and a person's scream can be another object. Each object can also have an associated position. Metadata of the object-based audio enables applications to specify where each sound object originates and how they should move. 3D bed object audio can be generated by software applications and other resources.

The controller 101 comprises a resource manager 190 for analyzing, processing, and communicating the contextual data. As will be described in more detail below, the contextual data can define the capabilities of one or more components, including but not limited to an encoder 106, an output device 105, an application 102 and/or other computing resources. The contextual data can also define one or more preferences, which may include user preferences, computer-generated preferences, etc. Based on the contextual data, the resource manager 190 can select a spatialization technology and a corresponding encoder 106 to process audio signals received from the applications 102 and/or preprocessors 103. The encoders 106 can utilize the selected spatialization technology to generate a spatially encoded stream that appropriately renders to an available output device.

The applications 102 can include any executable code configured to process object-based audio (also referred to herein as "3D bed audio" and "3D object audio") and/or channel-based audio (also referred to herein as "2D bed audio"). Examples of the applications 102 can include but, are not limited to, a media player, a web browser, a video game, a virtual reality application, and a communications application. The applications 102 can also include components of an operating system that generate system sounds.

In some configurations, the applications 102 can apply one or more operations to object-based audio, including, but not limited to, the application of one or more folding operations. In some configurations, an application 102 can receive contextual data from the controller 101 to control the number of objects of an object-based audio signal that is generated by the application 102. An application 102 can communicate an audio signal to one more preprocessors 104. An application can also communicate an audio signal directly to an input interface 103 of the controller 101.

The preprocessors 103 can be configured to receive an audio signal of one or more applications. The preprocessors 103 can be configured to perform a number of operations to a received audio signal and direct a processed audio signal to an input interface 103 of the controller 101. The operations of a preprocessor 103 can include folding operations that can be applied to object-based audio signals. The preprocessor 103 can also be configured to process other operations, such as distance based attenuation and shape based attenuation. In configurations involving one or more folding operations, a preprocessor 103 can receive contextual data from the controller 101 to control the number of objects of an object-based audio signal that is generated by the preprocessor 103.

The encoders 106 are configured to process channel-based audio and object-based audio according to one or more selected spatialization technologies. A rendered stream generated by an encoder 106 can be communicated to one or more output devices 105. Examples of an output device 105, also referred to herein as an "endpoint device," include, but are not limited to, speaker systems and headphones. An encoder 106 and/or an output device 105 can be configured to utilize one or more spatialization technologies such as Dolby Atmos, HRTF, etc.

The encoders 106 can also implement other functionality, such as one or more echo cancellation technologies. Such technologies are beneficial to select and utilize outside of the application environment, as individual applications do not have any context of other applications, thus can't determine when echo cancelation and other like technologies should be utilized.

Figure 1B:
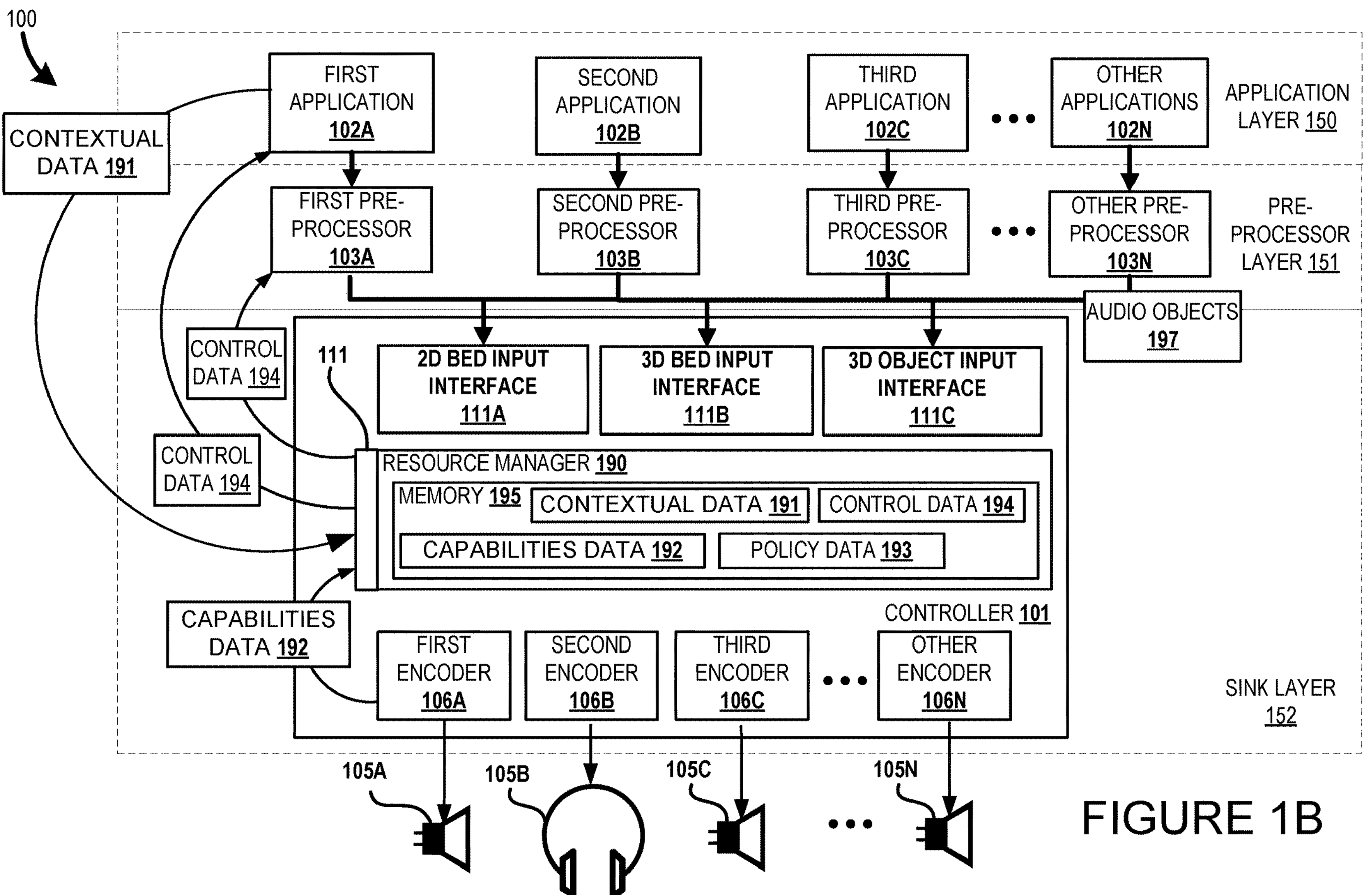
FIG. 1B illustrates an example multiprocessor computing device for enabling adaptive audio object allocations.

In the configuration shown in FIG. 1B, the controller 101 comprises a resource manager 190 for analyzing, processing, and an interface 111 (also referred to herein as an "application programing interface 111") communicating contextual data 191, capabilities data 192, and policy data 193. The contextual data 191 can be associated with, and describe aspects of, the individual applications 102 and other components such as the encoders, and/or output devices. For instance, the contextual data 191 can indicate a type of application, a level of user interaction, a status of an application, a status of a user interface of an application, etc. The capabilities data 192 can define the capabilities of one or more components, including but not limited to an encoder 106, an output device 105, and/or other computing resources. For instance, the capabilities data 192 can indicate a spatialization technology to utilize resources, which can also indicate a number of objects that can be processed by the one or more resources. For example, the capabilities data 192 can indicate that an endpoint device has Dolby Atmos or DTSX capabilities. The capabilities data 192 can also define one or more aspects of a system, including but not limited to processing capabilities and memory capabilities. The policy data 193 can define directives for allocating audio objects to individual applications 102 based on the contextual data 191 and the capabilities data 192. The policy data 193 for instance, can cause a system to allocate a number of audio objects to one or more applications 102 based on an application type, a level of user interactions, an interface status, and other factors. In some configurations, the policy data 193 can also indicate preferences. For example, the policy data 193 can indicate user preferences for a first spatialization technology, e.g., Dolby Atmos, over another spatialization technology, e.g., DTSX, when one or more conditions are present, e.g., when a particular application 102 is in operation, or when a particular application 102 has a particular status. A status can include starting an application, closing an application, entering or exiting a dormant state, etc.

In some configurations, the policy data 193 can define one or more conditions, i.e., any suitable criteria in such conditions can be associated with policy for allocating or revoking audio objects. In addition to allocating or revoking audio objects, the policy data 193 can define one or more conditions or criteria were audio objects generated by the applications are processed as 2D audio or 3D bed audio. Thus, depending on one or more factors, such as an audio type, e.g., music or sound effects, application type e.g., videogame or communication program, select audio streams generated by an application can be processed as 2D audio or 3D bed audio when an allocation of audio objects are revoked. In addition, such streams can be processed as 3D object audio when allocations are made to a particular application generating the streams.

The policy data 192 can also define a minimum number of audio objects and a maximum number of audio objects that can be allocated to an application. For instance, a game application may have a minimum number of audio objects. If the system does not have a number of free audio objects that meets the minimum number of audio objects, a request for the allocation to the game can be held in a queue until the number of free audio objects that meets the minimum number of audio objects. An allocation can also be limited to the maximum number of audio objects for a particular application.

Based on the contextual data 191, capabilities data 192, and policy data 193, the resource manager 190 can generate allocation data indicating a number of allocated audio objects (also referred to herein as control data 194) for at least one application 102 of the plurality of applications. The resource manager 190 can also transmit control data 194 to the individual applications causing the at least one application to control a number of generated audio objects 197, wherein the number of generated audio objects is based on the number of allocated audio objects. As the applications 102 generate audio objects, the audio objects can be communicated to the encoders 106. The encoders 106 can utilize a selected spatialization technology, which can be dynamically selected, to generate a spatially encoded stream that appropriately renders to an available output device. In some examples, the system 100 can cause an encoder 106 to generate a rendered output signal based on the generated audio objects. The system 100 can also cause a communication of the rendered output signal from the encoder to the endpoint device for producing a spatialized audio output based on the endpoint device, wherein the spatialized audio output is an audible output.

Figure 2:
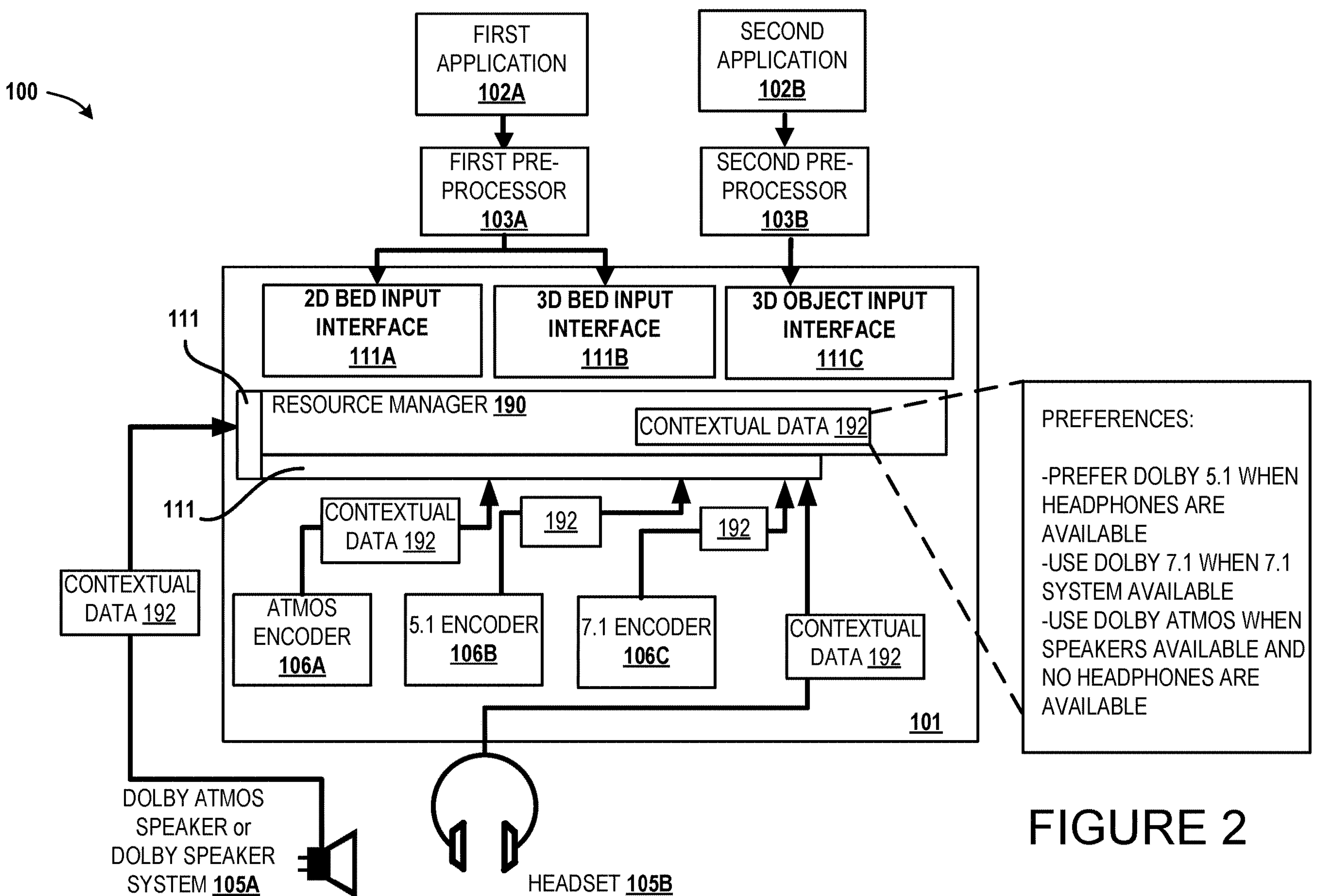
FIG. 2 illustrates an example scenario showing a selection of a spatialization technology based on contextual data.

Referring now to FIG. 2, an example scenario showing a selection of a spatialization technology based on contextual data is shown and described in more detail below. As summarized above, the contextual data 192, communicated to the resource manager 190 via an interface 111 (an API 111), can provide an indication of the capabilities of one or more components. For example, the contextual data 192 can indicate that a particular encoder 103 utilizes a particular spatialization technology. In this example, as shown in FIG. 2, the first encoder 106A is configured to utilize the Dolby Atmos technology. For illustrative purposes, the second encoder 106B is configured to utilize Dolby 5.1, and a third encoder 106C is configured to utilize Dolby 7.1. Contextual data 192 indicating such a configuration may be communicated from the first encoder 106A, the second encoder 106B, and the third encoder 106C to the resource manager 190. It can be appreciated that the contextual data 192 can be in any format, which may involve a signal and/or data, for indicating one or more capabilities.

Also shown in FIG. 2, the contextual data 192 can identify a configuration and/or capabilities of an output device 105. An output device may include a speaker system, a headphone system, or other arrangement utilizing one or more technologies. As shown in FIG. 2, for illustrative purposes, the first device 105A includes a speaker system that is optimized for Dolby Atmos or another technology such as Dolby 5.1 or 7.1. In addition, the second device 105B includes headphones. Contextual data 192 indicating such a configuration can be provided by a sensor, component, or device, and the contextual data 192 can be communicated to the resource manager 190.

The contextual data 192 can provide one or more preferences. The preferences can come from a number of sources, including an application, an operating system, or another suitable source. In one example, the preferences can be provided by a user via an application or an operating system module. In another example, the preferences can prioritize various spatialization technologies and/or devices. The preferences can also include one or more conditions and/or rules. For instance, the contextual data can indicate a preference to use Dolby Atmos, e.g., Dolby Atmos for Home Theater, when a Dolby Atmos for Home Theater speaker system is available. In addition, the contextual data may also indicate a preference to use Dolby 5.1 when headphones are available. The contextual data may also indicate a preference to use Dolby 7.1 when a Dolby 7.1 speaker system is available.

In the example of FIG. 2, based on the contextual data 192, the controller 101 can select a spatialization technology and a corresponding encoder to process the input signals, which may include channel-based audio and object-based audio, that appropriately renders the audio of multiple applications to an available output device. When both output devices are available, in this example configuration, the controller 101 would select the Dolby 5.1 encoder and communicate a combination of the 2D and 3D audio to the headphones 105B.

The techniques disclosed herein also allow the system 100 to dynamically switch between the spatialization technologies during use. For example, if the headphones 105B become unavailable, based on the example contextual data described above, the resource manager 190 can dynamically select another spatialization technology. In addition, the system can dynamically select another output device based on the contextual data. In the current example, given the example preferences, when the headphones 105B are disconnected, the controller 101 would select the first Dolby Atmos encoder 106A and communicate a rendering the 2D audio and 3D audio received at the interfaces 103 to the speakers 105A.

In the example of FIG. 2, the first preprocessor 103A generates 2D bed audio and 3D bed audio, and the second preprocessor 103B generates 3D object audio. In such an example, based on the sample contextual data described above, the 3D bed audio and the 3D object audio can be rendered utilizing the selected spatialization technology. By processing the object-based audio outside of the application layer, object-based audio generated by multiple applications can be coordinated at the controller 101, and when needed, combined with 2D audio. The controller 101 can cause one or more encoders 106 to process the input signals to generate a spatially encoded stream that appropriately renders to an available output device.

Figure 3A:
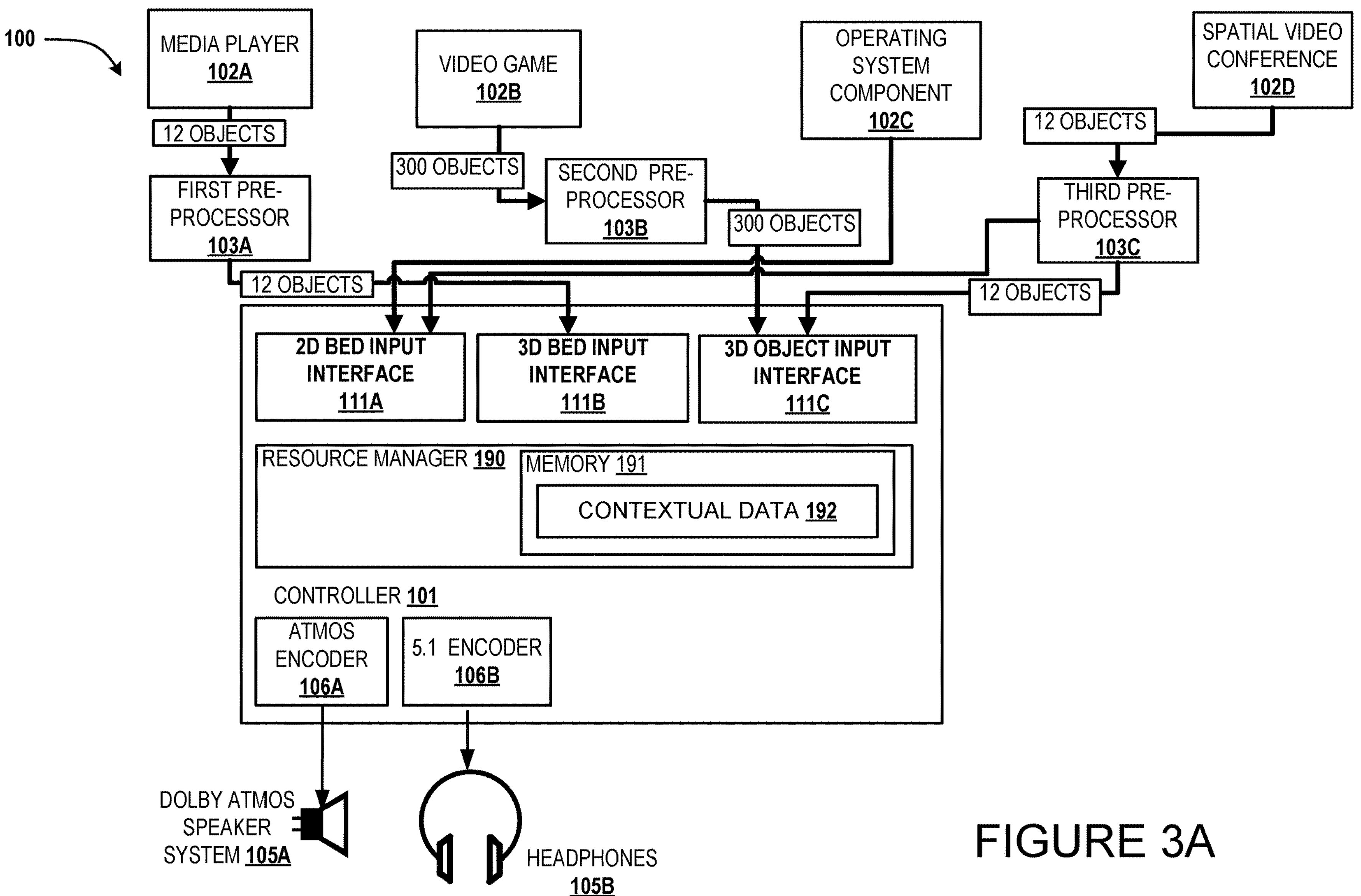
FIG. 3A illustrates an example scenario showing aspects of a system configured to allocate resources between components of the system.

Referring now to FIG. 3A, an example scenario showing the coordination of computing resources between components of the system 100 is shown and described in more detail below. In some configurations, the resource manager 190 can process the contextual data 192 to coordinate the applications 102, the preprocessors 103 and/or other components to distribute computing tasks related to the processing of object-based audio generated by one or more applications.

For illustrative purposes, consider a scenario where the first application 102A is a media player generating object-based audio having 12 objects, the second application 102B is a video game generating object-based audio having 300 objects, the third application 102 is an operating system component generating channel-based audio, and the fourth application 102 is a spatial video conference application 102D generating object-based audio having 12 objects. In this example, it is a given that the first output device 105A and the first encoder 106A utilize the Dolby Atmos technology. It is also a given that the contextual data 192 indicates a preference to utilize the Dolby Atmos technology.

In this configuration, given that the controller 101 receives contextual data 192 indicating that the Dolby Atmos technology should be utilized, it is also a given that the first encoder 106A can only manage 32 objects at one time. Given this scenario, the controller 101 is required to process 318 objects of the object-based audio, e.g., using some fold down operation and/or another operation, in order to enable the first encoder 106A to operate properly.

To reduce some of the processing required by the controller 101, the controller 101 determines a threshold number of objects based on the contextual data 192. The threshold number of objects can be divided and allocated among the applications 102 and/or preprocessors 103. The controller 101 can then instruct individual applications 102 and/or preprocessors 103 to control the number of objects they each produce, where each application 102 and/or preprocessor 103 are controlled to generate at least a portion of the threshold number of objects. The controller 101 can divide the threshold number of objects among the applications 102 and/or preprocessors 103 based on a policy and/or other data, including contextual data 192 and user input data. In some configurations, the controller 101 can communicate data and/or signals to the applications 102 and/or the preprocessors 103 to control the number of objects that are generated by the applications 102 and/or the preprocessors 103.

Figure 3B:
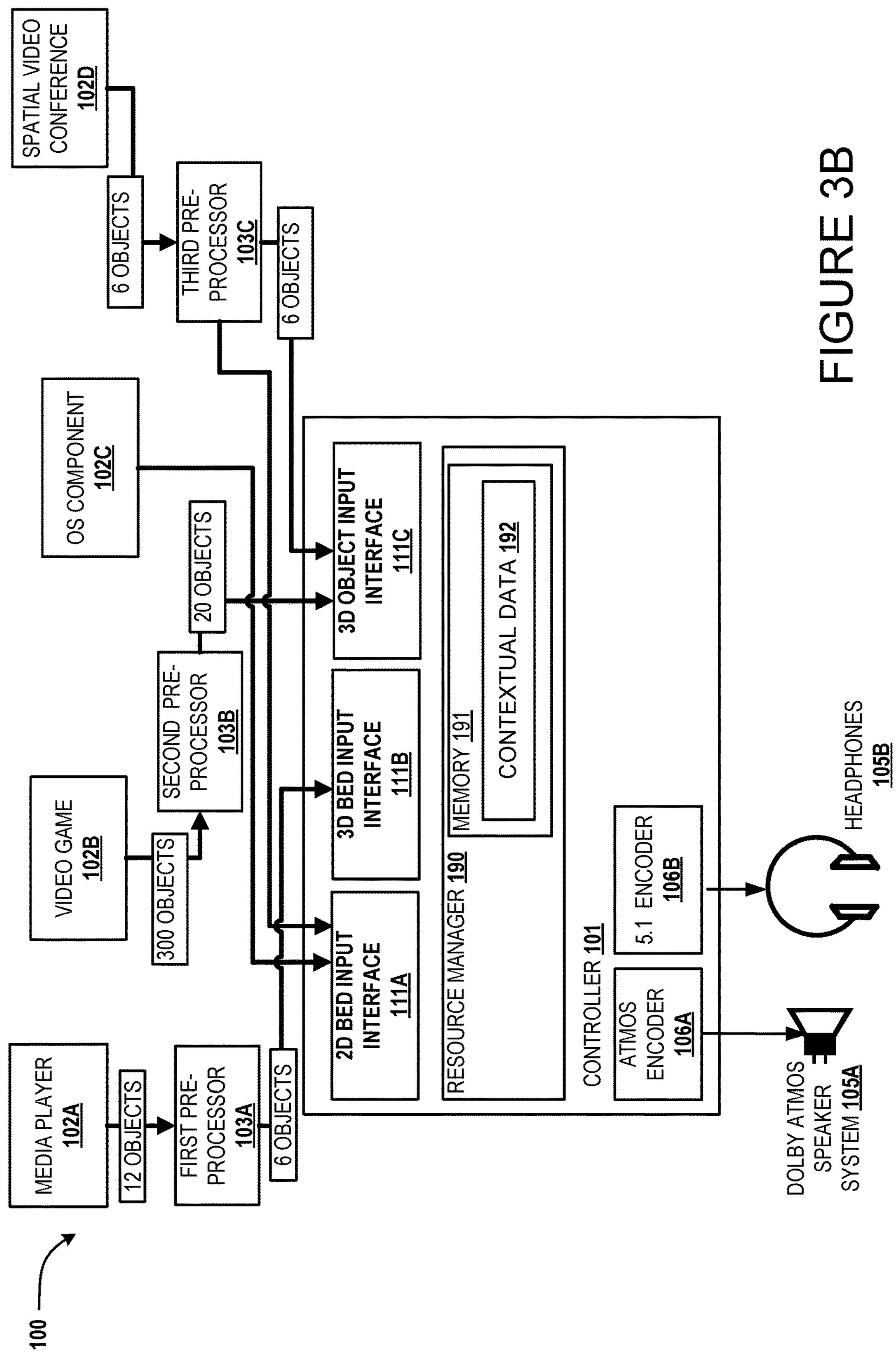
FIG. 3B illustrates a resulting scenario where a system allocates tasks to resources of the system.

FIG. 3B illustrates one example scenario that may result from the coordination of the controller 101. In this example, based on the capabilities of one or more components, e.g., the limitation of the Dolby Atmos encoder, the threshold number of objects is determined to be 32 objects. The data defining the threshold number of objects can be allocated and communicated to the various sources, e.g., the preprocessors 103 and/or the applications 102.

In some configurations, the controller 101 provides a signal or data that enables the preprocessors 103 to control the number of objects that is generated by each preprocessor 103. Each preprocessor 103 can control a number of objects of an associated object-based audio signal using any suitable technique or any suitable combination of techniques. For example, the controller 101 can cause a preprocessor 103 to utilize one or more co-location techniques, which can involve combining multiple objects into a single object. In another example, the controller 101 can cause a preprocessor 103 to utilize one or more culling techniques, which can involve the elimination of one or more selected objects. In yet another example, the controller 101 can cause a preprocessor 103 to utilize one or more fold down techniques, which can involve rendering some objects into a 3D bed signal.

In the example of FIG. 3B, the controller 101 communicates data defining the allocations of the threshold number of objects to each preprocessor 103. In this example, the first preprocessor 103A is instructed to fold down 12 objects to 6 objects. The second preprocessor 103B is instructed to reduce 300 objects to 20 objects. The spatial video conference application 102D is instructed to reduce its output from 12 objects to 6 objects. At the same time, the third preprocessor 103C is instructed to maintain the output of 6 objects. The object-based audio received at the controller 101 can then be processed by the controller 101 using one or more suitable encoding technologies to generate a rendered output. In some configurations, the controller 101 can mix the channel-based audio with the object-based audio. Thus, the channel-based audio provided by the operating system component 102C, received at the 2D bed input interface 111A, can be mix the with the object-based audio provided by the other sources (102A, 102B, and 102D).

In some configurations, the controller 101 can provide a signal or data that enables the applications 102 to control the number of objects that is generated by each application 102. In such configurations, each application can control the number of generated objects of an object-based audio signal in a manner similar to the examples above, which include any suitable technology or combination of technologies, including, but not limited to techniques involving co-location, culling, and/or fold down methods. Allocations of the threshold number of objects can instruct an individual source, e.g., a preprocessor 103, to decrease or increase a number of objects depending on the threshold number of objects.

The threshold number of objects can be determined based on a number of factors, including, but not limited to, the processing capabilities of the processors or software supporting the controller 101, the capabilities of the preprocessors 103, the capabilities of the applications 102, the capabilities of the encoders 106, the capabilities of the output devices 105, or a combination thereof. The threshold number of objects can also dynamically change as contextual data 192 or other aspects of a computing environment change. Thus, in the above-example, if the controller 101 selects another spatialization technology, e.g., one that is not limited to 32 objects, the threshold number of objects can change. These examples are provided for illustrative purposes and are not to be construed as limiting, as other factors can be used to determine a threshold number of objects.

In another aspect of the techniques disclosed herein, the threshold number of objects can be dynamically allocated to the various sources of object-based audio based on one or more factors. Data or a signal defining the allocations can be dynamically communicated to each source to control each source to coordinate the number objects they each generate.

The allocation of objects to each application 102 and/or preprocessor 103 can be based on a number of factors. For instance, the allocation of objects to an application can be based on the capabilities of the application 102 and/or the supporting hardware. In other examples, contextual data 192, which may define an interface environment can be used to determine the number of objects allocated to individual sources, e.g., applications 102 and/or preprocessors 103. For instance, an application that is running in full-screen mode will get a higher allocation of the threshold number of objects vs an application that's not running in full-screen mode.

In a virtual world environment, if a user is looking at a graphical object associated with a particular application and/or preprocessor, those particular sources may receive a higher allocation of the threshold number of objects. These examples are provided for illustrative purposes and are not to be construed as limiting, as other factors can be used to determine a number of objects that are dynamically allocated to an application 102 and/or a preprocessor 103.

Based on the number of audio objects that can be processed by the encoder and/or the endpoint device, the controller 101 determines allocations that can made to each application based on the policy data. The policy data 193 may define a number of priorities with respect to each type of application. For instance, priority may be given to communication applications, games, or other applications. In one illustrative example, the policy data 193 can provide a minimum number of objects for certain types of applications. For instance, at least two audio objects can be allocated to a communications application for proper operation. In such an example, the remaining audio objects that can be processed by the system 100 can be allocated to other applications such as a game.

The controller 101, by the use of control data 194, can then instruct individual applications 102 and/or preprocessors 103 to control the number of objects they each produce. The controller 101 can allocate the total number of audio objects determined from the capabilities data 192 among the applications 102 and/or preprocessors 103 based on a policy and/or other data, including contextual data 191, and user input data. In some configurations, the controller 101 can communicate control data 194 and/or signals to the applications 102 and/or the preprocessors 103 to control the number of objects that are generated by the applications 102 and/or the preprocessors 103.

In another example, with reference to FIG. 1B, based on the number of audio objects that can be processed by the encoder and/or the endpoint device, the controller 101 determines allocations that can made to each application based on the policy data. The policy data 193 may define a number of priorities with respect to each type of application. For instance, priority may be given to communication applications, games, or other applications. In one illustrative example, the policy data 193 can provide a minimum number of objects for certain types of applications. For instance, at least two audio objects can be allocated to a communications application for proper operation. In such an example, the remaining audio objects that can be processed by the system 100 can be allocated to other applications such as a game.

The controller 101, by the use of control data 194, can then instruct individual applications 102 and/or preprocessors 103 to control the number of objects they each produce. The controller 101 can allocate the total number of audio objects determined from the capabilities data 192 among the applications 102 and/or preprocessors 103 based on a policy and/or other data, including contextual data 191, and user input data. In some configurations, the controller 101 can communicate control data 194 and/or signals to the applications 102 and/or the preprocessors 103 to control the number of objects that are generated by the applications 102 and/or the preprocessors 103.

In the above example of FIG. 3B, for instance, the allocation to the video game 102B may be 20 objects while the game is in a certain mode, e.g., the game is running on half of the screen or the user is not looking at the user interface "UI" of the game. However, the allocation may be 30 objects (and the other applications receive an allocation of only one object each) while the game is in another mode, e.g., the game is in full-screen mode and/or the user is looking at the UI. The allocations to each application 102 and the preprocessors 103 may be dynamically modified as a user environment and/or capabilities of the supporting modules and/or devices change. In other examples, objects are allocated to an application are based on a window size associated with the application, objects are allocated to an application are based on a window position associated with the application, and objects are allocated to an application are based on a state of an application, e.g., a paused video temporality allocates objects to other applications. In a virtual reality (VR) environment, if an HMD user is looking at a rendering of a virtual object, system may allocates a higher number of objects for the object-based audio signal of an application associated with the virtual object. One or more sensors can be used to determine a user's gaze target and/or gaze direction. These examples are provided for illustrative purposes and are not to be construed as limiting. It can be appreciated that the controller 101 can direct applications or preprocessors to control any suitable number of objects.

Figure 4A:
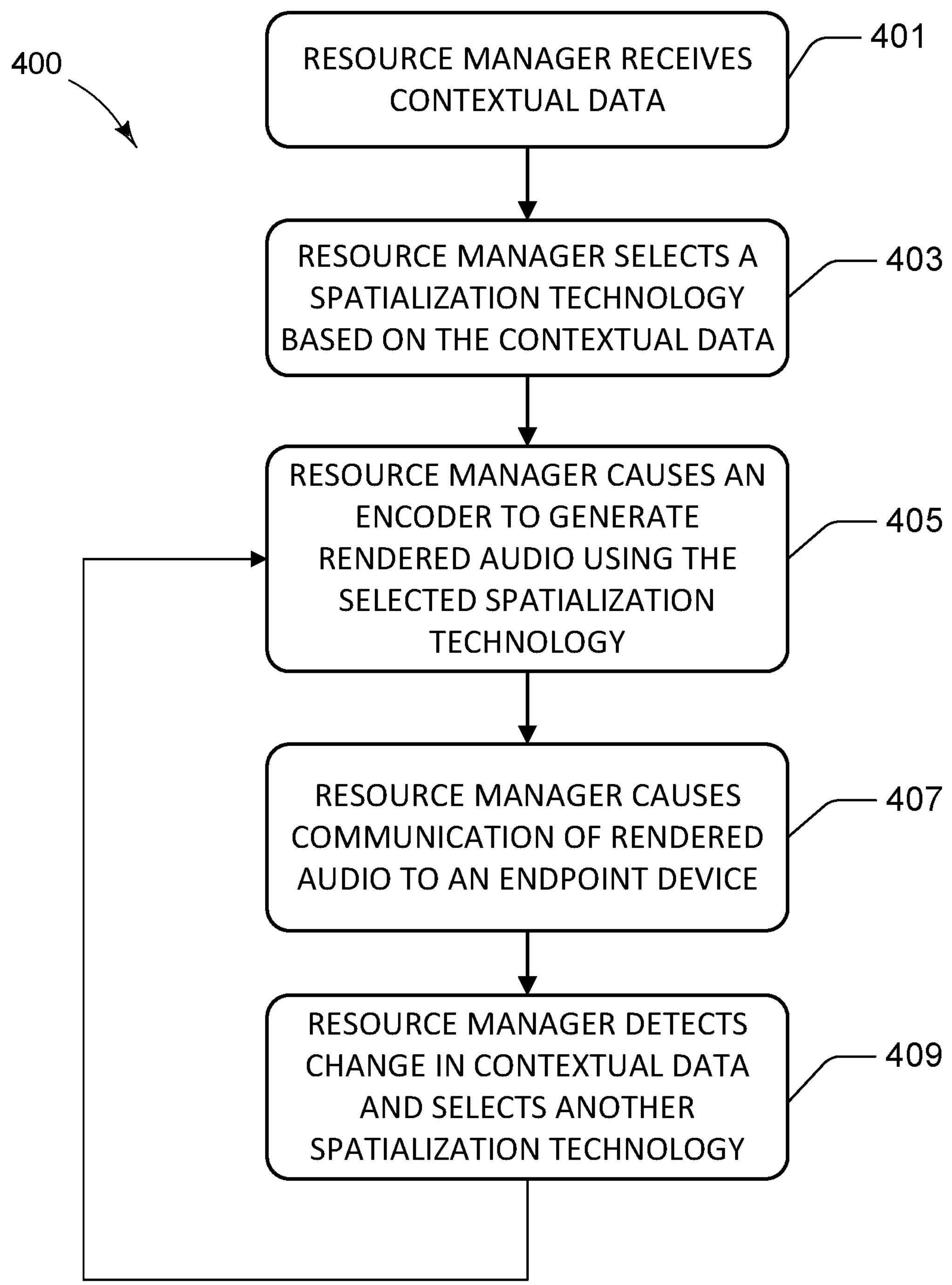
FIG. 4A illustrates aspects of a routine for enabling adaptive audio rendering.

Turning now to FIG. 4A, aspects of a routine 400 for enabling adaptive audio rendering are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an application, component and/or circuit, such as the resource manager 190. In some configurations, the resource manager 190 can be a dynamically linked library (DLL), a statically linked library, functionality produced by an application programing interface (API), a compiled program, an interpreted program, a script or any other executable set of instructions. Data and/or modules, such as the contextual data 192 and the resource manager 190, can be stored in a data structure in one or more memory components. Data can be retrieved from the data structure by addressing links or references to the data structure.

Figure 5:
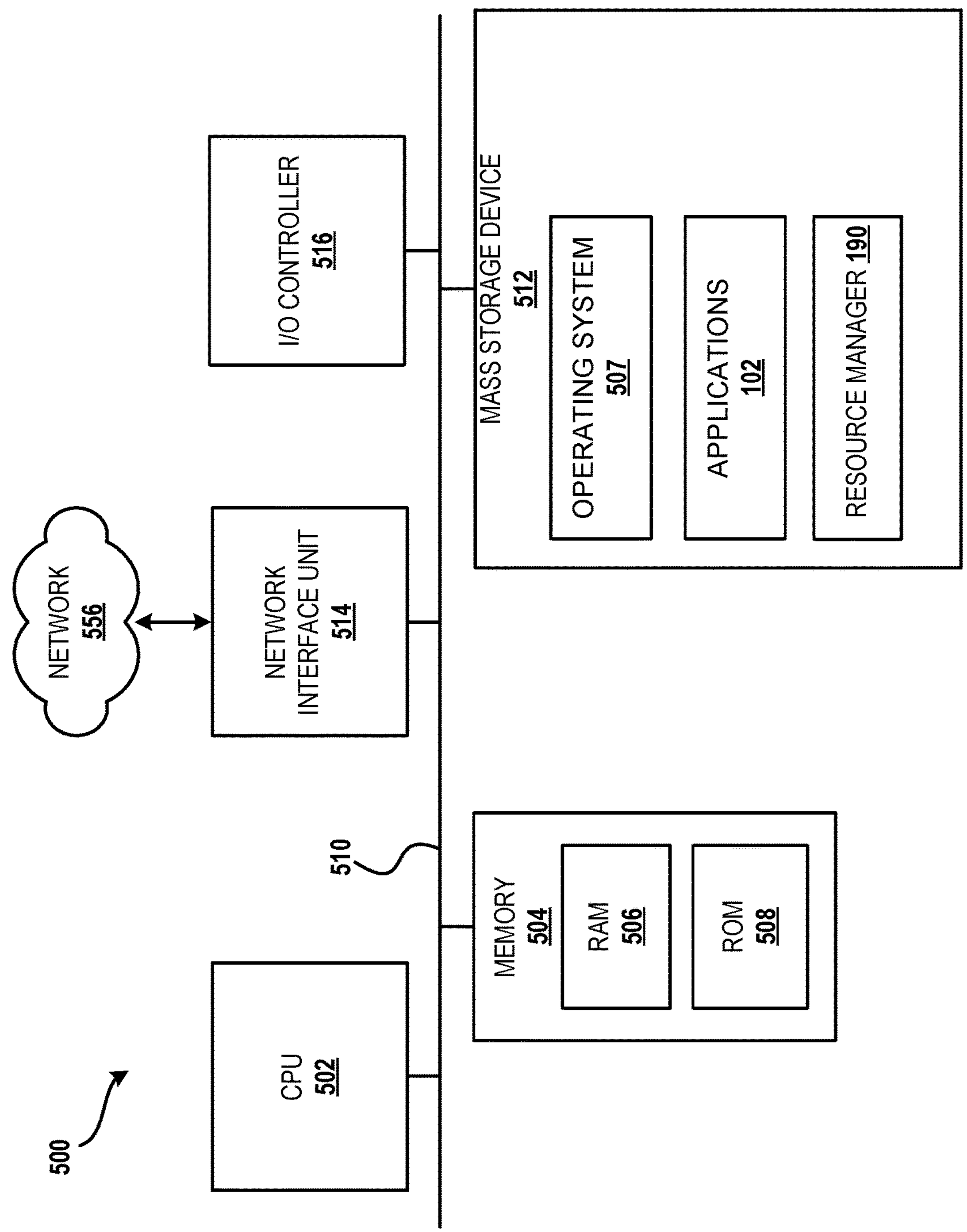
FIG. 5 is a computer architecture diagram illustrating an illustrative computer hardware and software architecture for a computing system capable of implementing aspects of the techniques and technologies presented herein.

Although the following illustration refers to the components of FIG. 1A, FIG. 1B, and FIG. 5, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. Any service, circuit or application suitable for providing the techniques disclosed herein can be used in operations described herein.

With reference to FIG. 4A, the routine 400 begins at operation 401, where the resource manager 190 receives contextual data 192. In some configurations, the contextual data 192 can provide an indication of the capabilities of one or more components. For example, the contextual data 192 can indicate that a particular encoder 103 utilizes a particular spatialization technology. In some configurations, the contextual data 192 can identify a configuration and/or capabilities of an output device 105. An output device, e.g., endpoint device, may include a speaker system, a headphone system, or other arrangement utilizing one or more technologies. The contextual data 192 can indicate whether the output device is configured to utilize, e.g., is compatible with, a particular spatialization technology, and/or whether an output device is in communication with the system 100.

In addition, in some configurations, the contextual data 192 can include preferences. The preferences can come from a number of sources, including an application, an operating system, or another suitable source. In one example, the preferences can be provided by a user via an application or an operating system module. In another example, the preferences can prioritize various spatialization technologies and/or devices. The preferences can also include one or more conditions and/or rules. For instance, the contextual data can indicate a preference to use Dolby Atmos when speaker systems utilizing such a technology are available. In addition, the contextual data may also indicate a preference to use Dolby 5.1 when headphones are available.

At operation 403, the resource manager selects a spatialization technology based, at least in part, on the contextual data. In some configurations, a spatialization technology can be selected based on the capabilities of an encoder or an output device. For instance, if an encoder is configured to accommodate the Dolby Atmos spatialization technology, the resource manager can select the Dolby Atmos spatialization technology. In some configurations, the spatialization technology can be selected based on one or more preferences. For instance, a user can indicate a preference for utilizing headphones over a speaker system when the headphones are available. If the headphones are configured to accommodate a particular spatialization technology and the headphones are plugged into the system 100, that particular spatialization technology can be selected. These examples are provided for illustrative purposes and are not to be construed as limiting.

Next, at operation 405, the resource manager causes an encoder to generate rendered audio using the selected spatialization technology. Any suitable spatialization technology can be utilized in operation 405. In addition, operation 405 can also include a process for downloading software configured to implement the selected spatialization technology. In some configurations, one or more encoders 106 can utilize the selected spatialization technology to generate a spatially encoded stream, e.g., rendered audio.

Next, at operation 407, the resource manager causes the communication of the rendered audio to an endpoint device. For example, the rendered audio can be communicated to a speaker system or headphones. In operation 407, the resource manager can also combine 2D audio with the rendered audio.

Next, at operation 409, the resource manager can detect a change within the contextual data, e.g., receive updated contextual data comprising one or more preferences, data indicating updated capabilities of an encoder, or data indicating updated capabilities of one or more endpoint devices. The techniques of operation 409 may occur, for example, when a user plugs in new headphones that is configured to accommodate a particular spatialization technology. In such an example, the resource manager may determine that the particular spatialization technology is the selected spatialization technology.

When a new spatialization technology is selected in operation 409, the routine 400 returns to operation 405 where the resource manager causes the encoder to generate rendered audio using the newly selected spatialization technology. In turn, the routine 400 continues to operation 407 where the rendered audio is communicated to one or more endpoint devices. It can be appreciated that the routine 400 can continue through operations 405 and 409 to dynamically change the selected spatialization technology as preferences and/or capabilities of the system 100 change.

Figure 4B:
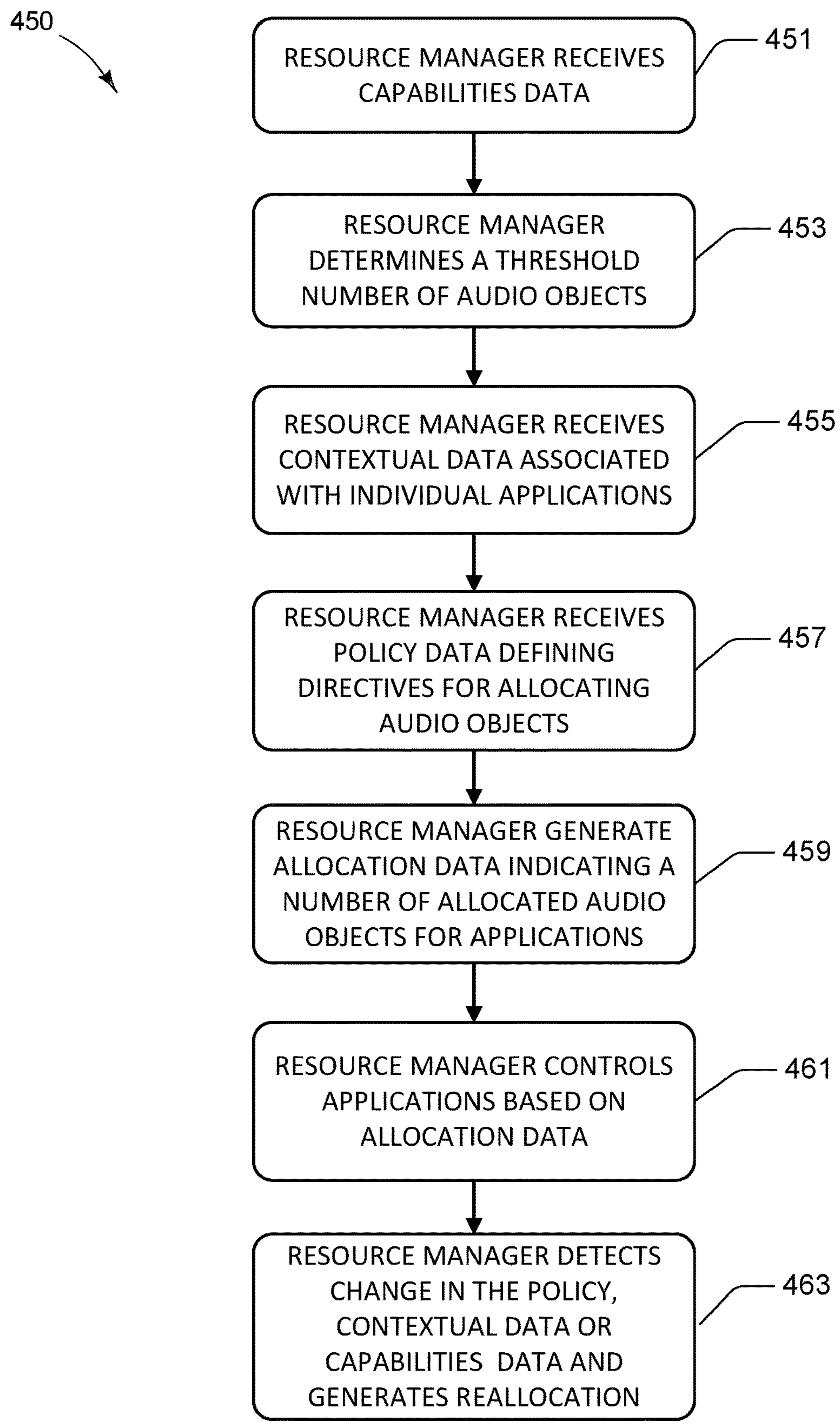
FIG. 4B illustrates aspects of a routine for enabling adaptive audio object allocations.

Turning now to FIG. 4B, aspects of a routine 450 for enabling adaptive audio object allocations are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 450 are described herein as being implemented, at least in part, by an application, component and/or circuit, such as the resource manager 190. In some configurations, the resource manager 190 can be a dynamically linked library (DLL), a statically linked library, functionality produced by an application programing interface (API), a compiled program, an interpreted program, a script or any other executable set of instructions. Data and/or modules, such as the contextual data 192 and the resource manager 190, can be stored in a data structure in one or more memory components. Data can be retrieved from the data structure by addressing links or references to the data structure.

Although the following illustration refers to the components of FIG. 1B and FIG. 5, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. Any service, circuit or application suitable for providing the techniques disclosed herein can be used in operations described herein.

With reference to FIG. 4B, the routine 450 begins at operation 451, where the resource manager 190 receives capabilities data indicating capabilities of an encoder and/or an endpoint device. For example, a Dolby Atmos encoder and a compatible speaker system can provide capabilities data or a signal indicating a predetermined number of audio objects, e.g., 32 audio objects.

Next, at operation 453, the resource manager 190 determines a threshold number of audio objects that can be processed by the encoder and the endpoint device based on the capabilities data. Operation 453 is optional. In some configurations, the threshold number of audio objects of a system can be fixed, or based on data received from another computer, preferences, or other data.

Next, at operation 455, the resource manager 190 receives contextual data associated with individual applications of a computing system. For instance, the contextual data can indicate a type of application, a level of user interaction, a status of an application, a status of a user interface of an application, etc.

Next, at operation 457, the resource manager 190 receives policy data defining directives for allocating audio objects to individual applications based on the contextual data. The policy data for instance, can cause a system to allocate a number of audio objects to one or more applications based on an application type and other factors.

Next, at operation 459, the resource manager 190 generates allocation data indicating a number of allocated audio objects for at least one application of the plurality of applications based, at least in part, on the policy data, the contextual data, and the threshold number of audio objects that can be processed by the encoder and the endpoint device. For instance, if a system has a threshold of 32 audio objects, a game application may receive an allocation of 28 objects and a spatial chat program may receive 4 objects. Such allocations can be based on the status of each application, the policy, and other factors.

In operation 459, as an optional operation, the resource manager 190 can also select a spatialization technology based, at least in part, on the contextual data and other data disclosed herein. In some configurations, a spatialization technology can be selected based on the capabilities of an encoder or an output device. For instance, if an encoder is configured to accommodate the Dolby Atmos spatialization technology, the resource manager can select the Dolby Atmos spatialization technology. In some configurations, the spatialization technology can be selected based on one or more preferences. For instance, a user can indicate a preference for utilizing headphones over a speaker system when the headphones are available. If the headphones are configured to accommodate a particular spatialization technology and the headphones are plugged into the system 100, that particular spatialization technology can be selected. These examples are provided for illustrative purposes and are not to be construed as limiting.

Next, at operation 461, the resource manager 190 controls the applications based on the allocation data. In some configurations, the resource manager 190 can transmit control data to the individual applications causing the at least one application to control a number of generated audio objects, wherein the number of generated audio objects is based on the number of allocated audio objects. The applications and/or preprocessors associated with individual applications can then generate a controlled number of audio objects based on the control data. The system can then process the audio objects generated by the applications to generate a spatially encoded stream that appropriately renders the audio of multiple applications to an available output device.

Next, at operation 463, the resource manager 190 detects a change in the policy data, the contextual data, and/or the capabilities data and generates a re-allocation based on the change. For example, as a user interacts with an application, e.g., moves or resizes a user interface, closes an application, increases or decreases a level of interaction, the resource manager 190 can reallocate audio objects to individual applications. The capabilities data can also be updated. For instance, if a user plugs in a new headset, the threshold number of audio objects may increase or decrease based on the capabilities of the new headset. Allocations to the applications can be adjusted based on the new threshold number of audio objects. In addition, a spatialization technology may change. In such an event, allocations to the applications can be adjusted based on the capabilities of the spatialization technology.

FIG. 5 shows additional details of an example computer architecture 500 for a computer, such as the computing device 101 (FIGS. 1A and 1B), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, one or more applications 102, the resource manager 190, and other data and/or modules.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:

a processor;

a computer-readable storage medium in communication with the processor, the computer-readable storage medium having computer-executable instructions stored thereupon which, when executed by the processor, cause the processor to:

receive contextual data indicating a number of audio objects associated with capabilities of an encoder in communication with the computing device;

select a spatialization technology from a plurality of spatialization technologies, wherein individual spatialization technologies of the plurality of spatialization technologies are each associated with a threshold number of audio objects, wherein the selected spatialization technology is associated with the threshold number of objects that correlates with the number of audio objects associated with capabilities of the encoder;

cause the encoder to generate a rendered output signal based on an input signal comprising object-based audio and channel-based audio processed by the selected spatialization technology; and cause a communication of the rendered output signal from the encoder to one or more speakers of an endpoint device.

2. The computing device of claim 1, wherein the contextual data comprises one or more preferences, and wherein the selection of the spatialization technology is further based on the one or more preferences.

3. The computing device of claim 1, wherein the contextual data defines a plurality of spatialization technologies including a first spatialization and a second spatialization technology, and wherein determining the selected spatialization technology comprises:

determining when the endpoint device is compatible with the first spatialization technology;

determining the first spatialization technology as the selected spatialization technology when the endpoint device is compatible with the first spatialization technology;

determining when the endpoint device is compatible with the second spatialization technology;

determining the second spatialization technology as the selected spatialization technology when the endpoint device is compatible with the second spatialization technology and when the endpoint device is not compatible with the first spatialization technology.

4. The computing device of claim 1, wherein the contextual data comprises one or more preferences prioritizing a plurality of endpoint devices including the endpoint device as a first priority and a second endpoint device as a second priority, and wherein determining the selected spatialization technology comprises:

determining when the endpoint device is in communication with the encoder;

determining the first spatialization technology as the selected spatialization technology when it is determined that the endpoint device is in communication with the encoder;

determining that the second endpoint device of the plurality of endpoint devices is compatible with the second spatialization technology;

determining when the second endpoint device is in communication with the encoder; and determining the second spatialization technology as the selected spatialization technology when it is determined that the second endpoint device is in communication with the encoder and when the second endpoint device is compatible with the second spatialization technology.

5. The computing device of claim 1, wherein selecting the spatialization technology comprises:

determining that the endpoint device is compatible with a first spatialization technology;

determining when the first endpoint device is in communication with the encoder;

determining the first spatialization technology as the selected spatialization technology when it is determined that the first endpoint device is in communication with the encoder and when it is determined that the endpoint device is compatible with the first spatialization technology;

determining that a second endpoint device is compatible with a second spatialization technology;

determining when the second endpoint device is in communication with the encoder; and determining the second spatialization technology as the selected spatialization technology when it is determined that the second endpoint device is in communication with the encoder and when it is determined that the second endpoint device is compatible with the second spatialization technology.

6. The computing device of claim 1, wherein the contextual data is generated, at least in part, by an application configured to receive an input, wherein the selection of the spatialization technology is further based on the input.

7. The computing device of claim 1, wherein the contextual data is generated, at least in part, by an application configured to determine a priority, wherein the selection of the spatialization technology is further based on the priority.

8. A computing device, comprising:

a processor;

a computer-readable storage medium in communication with the processor, the computer-readable storage medium having computer-executable instructions stored thereupon which, when executed by the processor, cause the processor to:

receive contextual data indicating a threshold number of audio objects that can be processed by the computing device;

generate allocation data indicating a number of allocated audio objects for the at least one application of a plurality of applications, wherein the number of allocated objects is limited to the threshold number of audio objects that can be processed by the computing device; and transmit the allocation data to the at least one application causing the at least one application to limit a number of generated audio objects to the number of allocated audio objects, wherein the at least one application causes an encoder to generate of an audio output at one or more speakers based on the generated audio objects.

9. The computing device of claim 8, wherein the computer-executable instructions further cause the processor to:

receive updated contextual data indicating a state change associated with the individual applications;

generate updated allocation data indicating an updated number of allocated audio objects for the at least one application based on the updated contextual data; and transmit updated allocation data to the at least one application for modifying the number of audio objects generated by the at least one application.

10. The computing device of claim 8, wherein the computer-executable instructions further cause the processor to:

receive updated capabilities data indicating a change to the capabilities of the computing device;

generate updated allocation data indicating an updated number of allocated audio objects for the at least one application based on the updated contextual data; and transmit updated allocation data to the at least one application for modifying the number of audio objects generated by the at least one application.

11. The computing device of claim 8, wherein the at least one application comprises a first application and a second application, wherein the allocation data indicates a first number of allocated audio objects for the first application and a second number of allocated objects for the second application, wherein the first number of allocated audio objects is greater than the second number of allocated objects when policy data indicates that a priority value associated with the first application is higher than a priority value associated with the second application.

12. The computing device of claim 8, wherein the contextual data indicates a level of user interaction with the individual applications, wherein generating the allocation data indicating the allocation of audio objects for the at least one application is further based on the level of user interaction with the individual applications.

13. The computing device of claim 8, wherein the contextual data indicates a priority value that is based on a user interface arrangement, wherein generating the allocation data indicating the allocation of audio objects for the at least one application is further based on the priority value.

14. The computing device of claim 8, wherein the computer-executable instructions further cause the processor to:

cause the encoder to generate a rendered output signal based on the generated audio objects; and cause a communication of the rendered output signal from the encoder to the endpoint device for producing a spatialized audio output based on the endpoint device, wherein the spatialized audio output is an audible output.

15. The computing device of claim 8, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when a first graphical user interface associated with the first application has a larger display area than a second graphical user interface associated with the second application.

16. A computing device, comprising:

a processor;

a computer-readable storage medium in communication with the processor, the computer-readable storage medium having computer-executable instructions stored thereupon which, when executed by the processor, cause the processor to:

receive contextual data indicating a number of audio objects associated with capabilities of a encoder of an endpoint device in communication with the computing device;

select a spatialization technology from a plurality of spatialization technologies, wherein individual spatialization technologies of the plurality of spatialization technologies are each associated with a threshold number of audio objects, wherein the selected spatialization technology is associated with the threshold number of objects that correlates with the number of audio objects associated with capabilities of the encoder;

generate allocation data indicating a number of allocated audio objects for at least one application of the plurality of applications based, at least in part, on the threshold number of objects;

transmit the allocation data to the at least one application, wherein the allocation data causes the at least one application to limit a number of generated audio objects to the number of allocated audio objects; and cause the encoder to generate a rendered output signal from the number of generated audio objects using the selected spatialization technology, wherein the output signal is communicated from the encoder to one or more speakers of the endpoint device for generating an audio output.

17. The computing device of claim 16, wherein the computer-executable instructions further cause the processor to:

receive updated contextual data indicating a state change associated with the individual applications;

generate updated allocation data indicating an updated number of allocated audio objects for the at least one application based on the updated contextual data; and transmit updated allocation data to the at least one application for modifying the number of audio objects generated by the at least one application.

18. The computing device of claim 16, wherein the computer-executable instructions further cause the processor to:

receive updated capabilities data indicating a change to the capabilities of the encoder and the endpoint device;

generate updated allocation data indicating an updated number of allocated audio objects for the at least one application based on the updated contextual data; and transmit updated allocation data to the at least one application for modifying the number of audio objects generated by the at least one application.

19. The computing device of claim 16, wherein the at least one application comprises a first application and a second application, wherein the allocation data indicates a first number of allocated audio objects for the first application and a second number of allocated objects for the second application, wherein the first number of allocated audio objects is greater than the second number of allocated objects when policy data indicates that a priority value associated with the first application is higher than a priority value associated with the second application.

20. The computing device of claim 16, wherein the contextual data indicates a level of user interaction with the individual applications, wherein generating the allocation data indicating the allocation of audio objects for the at least one application is further based on the level of user interaction with the individual applications.

* * * * *